United States Patent Office 3,547,878
Patented Dec. 15, 1970

3,547,878
SYNERGISTIC FLAME-RETARDANT COMPOSITIONS CONTAINING DIELS-ALDER ADDUCTS AND PHOSPHOROUS COMPOUNDS
Christos Savides, Piscataway Township, Middlesex County, N.J., assignor to American Cyanamid Company, Stamford, Conn., a corporation of Maine
No Drawing. Filed July 1, 1968, Ser. No. 741,327
Int. Cl. C08f 45/58; C08g 51/59
U.S. Cl. 260—45.8     10 Claims

ABSTRACT OF THE DISCLOSURE

Synergistic flame-retardant compositions comprising a phosphonate and 2,3-dicarboxy-5,8-endomethylene-5,6,7,8,9,9 - hexachloro - 1,2,3,4,4a,5,8,8a - octahydronaphthalene anhydride and its esters and compositions comprising a thermoplastic resin and said synergistic compositions are disclosed.

BACKGROUND OF THE INVENTION

The production of thermoplastic resin compositions which are flame-retardant is of considerable commercial importance in that such articles as castings, moldings, foamed or laminated articles, etc. are required, or at least desired, to be resistant to fire and flame and to possess the ability to endure heat without deterioration. The typical illustrations of applications of such compositions include castings for live electrical contacts which should not be ignited by flames or sparks, structural members such as pipes, wall coverings, wall paneling, windows, etc. and such items as ash trays, waste baskets, fibers and the like.

The use of certain additives for the purpose of reducing the flammability of various thermoplastic polymers is well known to those skilled in the art. Among the additives currently employed for such a use are various specific types of phosphorus containing compounds. These phosphorus compounds are generally used either alone or in combination with other materials such as aliphatic or aromatic antimonous compounds. Certain analogous materials such as chlorostyrene copolymers, chlorinated paraffin waxes, alone or with antimony oxide or phosphorus compounds are also known to be effective flame-retardants for resinous materials. One drawback of many of these known compounds and combinations of compounds, however, has been the fact that generally large amounts, i.e., upwards of 45% of the additive must be incorporated into the polymer in order to render it reasonably flame-retardant. Such large quantities of additive oftimes deleteriously alter the properties of the polymer and moreover, some additives tend to crystallize or oil out of the polymer after a relatively short time of incorporation therein.

Furthermore, these prior art systems generally are thermally unstable and, as such, are not suitable for incorporation into polymeric materials which require high temperature processing conditions because they tend to discolor or otherwise degrade the resultant processed polymer rendering it unfit for ultimate commercial applications. Additionally, most of the prior art additives are liquid in their natural or most common state and therefore may affect other physical properties of the polymeric material to which they are added.

SUMMARY

I have now found that superior flame-retarding properties can be imparted to thermoplastic polymers by incorporating into the polymer a synergistic combination or mixture of (A) a compound having the formula.

(I) 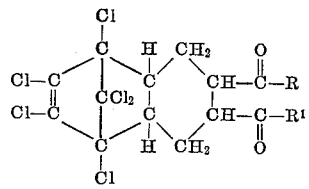

wherein R and R¹ taken together constitute an oxygen atom or R and R¹ taken separately are, individually, a hydroxy radical, an alkoxy radical of 1-8 carbon atoms, inclusive, or a haloalkoxy radical of 1-4 carbon atoms, inclusive and (B) a phosphonate having either the formula (II) 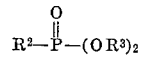

wherein $R^2$ represents an aryl radical of 6-10 carbon atoms, inclusive, a halo or alkyl substituted aryl radical of 6-10 carbon atoms, inclusive, an alkyl radical of 1-8 carbon atoms, inclusive, or a halo-substituted alkyl radical of 1-8 carbon atoms, inclusive, and $R^3$ represents a halo-substituted aryl radical of 6-10 carbon atoms, inclusive, an alkyl radical of 1-8 carbon atoms, inclusive, a halo-substituted alkyl radical of 1-8 carbon atoms, inclusive, an aralkyl radical of 7-14 carbon atoms, inclusive, or an ar-halo-substituted aralkyl radical of 7-14 carbon atoms, inclusive, or the formula (III) 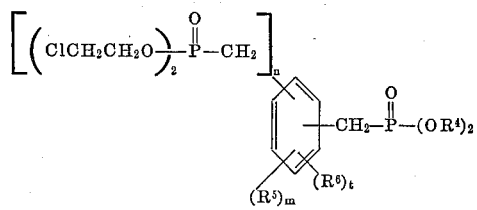

wherein $R^4$ is the same as $R^3$, above, and $R^5$ and $R^6$, individually, represent hydrogen, bromine, chlorine, an alkyl radical of 1-4 carbon atoms, inclusive, or a haloalkyl radical of 1-4 carbon atoms, inclusive, and $n$, $m$, and $t$ are whole positive integers of 0-5, inclusive, the total of $n+m+t$ being 5.

The novel synergistic combinations provide improved flame-retardance over the additives of the prior art and, additionally, generally provide this superior result at lower concentrations than previously believed to be necessary for most of the known additives. The results shown by the use of the above-mentioned flame-retardant combinations are surprising and unexpected in that the combinations provide a greater degree of flame-retardancy than one would expect from the results shown by the use of the components individually, i.e., they are synergistic.

Additionally, the effectiveness of the combination is achieved in the absence of any third ingredient, such as antimony compounds or chlorinated hydrocarbons. This synergism, moreover, does not appear to be limited to specific combinations, but is broadly applicable to any combination of a compound represented by Formula I and a compound represented by Formulae II or III.

DESCRIPTION OF THE INVENTION INCLUDING PREFERRED EMBODIMENTS

As mentioned above, the first critical component of my novel flame-retardant compositions is a compound represented by Formula I, above. These compounds are well known in the art, as are methods of their production, as represented by U.S. Pat. Nos. 3,152,172 and 3,196,191 which patents are hereby incorporated herein by reference.

As disclosed in said references, the compounds of Formula I are generally prepared by first preparing the anhydride, wherein R and $R^1$ together are oxygen, by the reaction of hexachlorocyclopentadiene and cis-4-cyclohexene-1,2-dicarboxylic anhydride. The free dicarboxylic acid and the esters may then be prepared from the anhydride by conventional means, i.e. reaction with an appropriate alcohol or substituted alcohol, e.g. phenol. Alternatively, the acid or esters may be prepared by reaction of the hexachlorocyclopentadiene and the diacid or diester of said cis-4-cyclohexene-1,2-dicarboxylic anhydride.

The anhydride represented by Formula I is a crystalline solid material having a melting point of about 275° C. The other compounds are also solids of high melting points. The compounds of Formula I may be used in concentrations ranging from about 1.0% to about 20.0%, by weight, based on the weight of the polymer to which they are added.

The second critical component of my novel flame-retardant compositions is a phosphonate represented by Formulae II or III, above. These phosphonates may be produced by any known procedure, one of which is disclosed in U.S. Pat. No. 2,678,940, which patent is hereby incorporated herein by reference.

The phosphonate may be incorporated into the polymeric material in concentrations ranging from about 1.0% to about 20.0%, by weight, based on the weight of the polymer to which it is added.

The ratio of the compound represented by Formula I to the compound represented by Formulae II or III should range from about 3 to 1 to 1 to 3, respectively, in the polymer.

Any thermoplastic polymeric material may be rendered flame-retardant by the incorporation therewith of the above-identified flame-retardant combinations. Specifically, however, the vinyl type polymers, wherein a monomeric material is polymerized, by known methods, e.g. by use of free-radical generating catalysts, irradiation, anionic and cationic catalysts, etc. are those preferred. Examples of the vinyl type polymers which may be used to form my novel compositions are the homopolymers and copolymers of acrylamides and N-substituted acrylamides, polyvinyl acetates, butadiene copolymers, e.g. acrylonitrile-butadiene-styrene copolymers, the polymers of acrylonitrile e.g. acrylonitrile, styrene copolymers, polyacrylonitrile etc.

Additionally and even more preferably, one may incorporate the flame-retardant synergistic combinations mentioned above into such polymers as the homopolymers and copolymers of styrene, i.e. polystyrene, α-methyl styrene polymers, styrene, acrylonitrile copolymers, etc. the α-olefin polymers, such as the homopolymers and copolymers, etc. containing, as the major constituent thereof, ethylene, propylene, such as polyethylene, including high density polyethylene, polypropylene and the like and the acrylate and methacrylate homopolymers produced from monomers having the formula (IV)

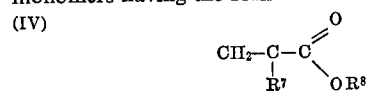

wherein $R^7$ is hydrogen or a methyl radical and $R^8$ is an alkyl radical having from 1 to 6 carbon atoms, inclusive.

Examples of monomers represented by Formula IV include methyl acrylate, ethyl acrylate, n-propyl acrylate, isopropyl acrylate, n-butyl acrylate, t-butyl acrylate, isobutyl acrylate, n-amyl acrylate, t-amyl acrylate, hexyl acrylate and their corresponding alkyl methacrylates, etc. and copolymers thereof with one another and with minor amounts, i.e. not more than about 10%, by weight, of comonomers such as acrylonitrile, styrene, etc.

Also such polymers as the polyamides, e.g. adipic acid-hexamethylenediamine reaction products; the polycarbonates, i.e. phosgene-Bisphenol A reaction products; the so-called impact polymers, i.e. rubber-polymer blends such as blends of polystyrene with 5–10% of butadiene-styrene, the ABS type resins, e.g. blends of butadiene-styrene and styrene-acrylonitrile; blends of grafted polybutadiene, etc. with hard, resinous polymers such as terpolymers of methyl methacrylate, styrene and acrylonitrile, etc., and flammable plasticized polymers such as plasticized polyvinylchloride, and the like may be made flame-retardant by the incorporation therein of the synergistic combinations discussed hereinabove.

The novel flame-retardant combinations claimed herein may be added to the various polymers, as such, or as individual components, by any known method. That is to say, the flame-retardant components may be added to the polymer, as such, or in combination by (1) milling the polymer and the components on, for example, a two-roll mill, in a Banbury mixer, etc. by (2) molding the components and the polymer simultaneously, by (3) extruding the polymer and components or by (4) merely blending all the materials together in powder or liquid form and thereafter forming the desired ultimate product. Additionally, the flame-retardant components or combination may be added during the production of the polymer, i.e. during the monomer polymerization, provided, however, that the catalyst, etc. other conditions and other ingredients of the polymerization system are inert thereto.

It is also within the scope of the instant invention to incorporate such ingredients as plasticizers, dyes, pigments, heat and light stabilizers, antioxidants, antistatic agents, photochromic materials and the like into the flame-retarded polymer compositions claimed herein.

The following examples are set forth for purposes of illustration only and are not to be construed as limitations on the present invention except as set forth in the appended claims. All parts and percentages are by weight unless otherwise specified.

METHOD OF TESTING

Any appropriate flame-retardance test may be used to determine the flame-retardant properties of any specific combination of compounds represented by Formulae I, II and III, above. One test I have found to be reasonably efficient is a modified version of that test identified as ASTM-D-635-56T. The specifications for this test are: a cylindrical extrudate 6-8" in length, 0.045" in diameter is prepared using a melt index apparatus (ASTM-D-1238-627), marked at the 1" and 5" lengths and then supported with its longitudinal axis horizontal. A Bunsen burner with a 1" blue flame is placed under the free end of the strip and is adjusted so that the flame tip is put in contact with the strip end nearest the 5" marking. At the end of 30 seconds, the flame is removed and the specimen is allowed to burn. If the specimen does not continue to burn after the first ignition, it is immediately recontacted with the burner for another 30 seconds. If, after the two burnings, the strip is not burned to the 5" mark, the specimen is designated as "non-burning." If the specimen has burned to the 5" mark but not to the 1" mark it is designated as "self-extinguishing."

EXAMPLE 1

To 80 parts of polypropylene are added 10 parts of bis(2-chloroethyl)naphthyl phosphonate and 10 parts of 2,3 - dicarboxy - 5,8 - endomethylene - 5,6,7,8,9,9-hexachloro - 1,2,3,4,4a,5,8,8a - octahydronaphthalene anhydride (hereinafter sometimes called DEMON). The resultant mixture is placed in a suitable blender and dry-blended for 4 hours. The blended product is then transferred to a melt-index apparatus which is preheated to 250° C. Following one minute of aging, a 2.2 kg. weight is placed on the plunger and an extrudate of 6–8 inches in length is obtained. This specimen is marked and tested according to the above-numerated flame-retardance test. The results are set forth in Table I, below.

Various other flame-retardant combinations are then incorporated into various other resins according to Example 1 and comparisons are made between the resultant compositions and control compositions. These results are also set forth in Tables I and II, below.

TABLE I

| Example | Phosphonate R² | R³ | Percent | DEMON derivative | Percent | Polymer | Flame-test results |
|---|---|---|---|---|---|---|---|
| 1 | naphthyl | 2-chloroethyl | 10 | DEMON | 10 | Polypropylene | Passed. |
| 2 | naphthyl | 2-chloroethyl | 10 | | | do | Failed. |
| 3 | | | | DEMON | 15 | do | Do. |
| 4 | octyl | p-chlorophenyl | 15 | DEMON | 15 | do | Passed. |
| 5 | octyl | p-chlorophenyl | 15 | | | do | Failed. |
| 6 | tolyl | p-bromophenyl | 10 | DEMON | 10 | do | Passed. |
| 7 | tolyl | p-brompohenyl | 15 | | | do | Failed. |
| 8 | 2-bromoethyl | 2-phenylethyl | 20 | DEMON | 20 | High density polyethylene | Passed. |
| 9 | 2-bromoethyl | 2-phenylethyl | 20 | | | do | Failed. |
| 10 | | | | DEMON | 20 | do | Do. |
| 11 | p-chlorophenyl | ethyl | 15 | DEMON | 15 | Polypropylene | Passed. |
| 12 | p-chlorophenyl | ethyl | 15 | | | do | Failed. |
| 13 | 2-chloroethyl | 2-chloroethyl | 10 | DEMON | 10 | do | Passed. |
| 14 | 2-chloroethyl | 2-chloroethyl | 10 | | | do | Failed. |
| 15 | phenyl | 2-chloroethyl | 5 | Dicarboxy derivative | 5 | Polystyrene | Passed. |
| 16 | phenyl | 2-chloroethyl | 5 | | | do | Failed. |
| 17 | | | | Dicarboxy derivative | 5 | do | Do. |
| 18 | methyl | 2-bromoethyl | 15 | Monocarboxy, methyl ester | 15 | Polyamide¹ | Passed. |
| 19 | methyl | 2-bromoethyl | 15 | | | do | Failed. |
| 20 | | | | Monocarboxy, methyl ester | 15 | do | Do. |
| 21 | phenyl | ethyl | 10 | 2-chloroethyl diester | 10 | Polypropylene | Passed. |
| 22 | phenyl | ethyl | 10 | | | do | Failed. |
| 23 | | | | 2-chloroethyl diester | 10 | do | Do. |
| 24 | phenyl | 2-chloroethyl | 10 | Methyl diester | 10 | Polystyrene | Passed. |
| 25 | | | | do | 10 | do | Failed. |
| 26 | phenyl | 2-chloroethyl | 10 | Octyl diester | 10 | do | Passed. |
| 27 | | | | do | 10 | do | Failed. |

Code for Table I: (¹)=adipic acid-hexamethylenediamine reaction product.

TABLE II

| Example | Phosphonate R⁴ | R⁵ | R⁶ | m | n | t | Percent | DEMON derivative | Percent | Polymer | Flame-test results |
|---|---|---|---|---|---|---|---|---|---|---|---|
| 28 | ethyl | bromomethyl | methyl | 2 | 0 | 3 | 10 | DEMON | 5 | Polypropylene | Passed. |
| 29 | ethyl | bromomethyl | methyl | 2 | 0 | 3 | 15 | | | do | Failed. |
| 30 | ethyl | H | Cl | 3 | 0 | 2 | 10 | DEMON | 5 | do | Passed. |
| 31 | ethyl | H | Cl | 3 | 0 | 2 | 15 | | | do | Failed. |
| 32 | ethyl | H | Br | 3 | 0 | 2 | 7.5 | DEMON | 7.5 | do | Passed. |
| 33 | ethyl | 2 | Br | 3 | 0 | 2 | 15 | | | do | Failed. |
| 34 | 4-chlorooctyl | Br | H | 2 | 0 | 3 | 8 | DEMON | 7 | do | Passed. |
| 35 | 4-chlorooctyl | Br | H | 2 | 0 | 3 | 10 | | | do | Failed. |
| 36 | p-bromophenyl | methyl | H | 2 | 0 | 3 | 10 | DEMON | 10 | do | Passed. |
| 37 | p-bromophenyl | methyl | H | 2 | 0 | 3 | 10 | | | do | Failed. |
| 38 | 2-chloroethyl | Br | H | 1 | 0 | 4 | 5 | DEMON | 5 | do | Passed. |
| 39 | 2-chloroethyl | Br | H | 1 | 0 | 4 | 5 | | | do | Failed. |
| 40 | 2-chloroethyl | H | Br | 4 | 0 | 1 | 5 | Methyl diester | 5 | do | Passed. |
| 41 | 2-chloroethyl | H | Br | 4 | 0 | 1 | 5 | | | do | Failed. |
| 42 | | | | | | | | Methyl diester | 10 | do | Do. |
| 43 | ethyl | H | Br | 4 | 0 | 1 | 10 | Octyl diester | 10 | do | Passed. |
| 44 | ethyl | H | Br | 4 | 0 | 1 | 10 | | | do | Failed. |
| 45 | | | | | | | | Octyl diester | 10 | do | Do. |
| 46 | p-bromobenzyl | Br | H | 1 | 0 | 4 | 20 | DEMON | 20 | (¹) | Passed. |
| 47 | p-bromobenzyl | Br | H | 1 | 0 | 4 | 20 | | | do¹ | Failed. |
| 48 | | | | | | | | DEMON | 20 | do¹ | Do. |
| 49 | 2-chloroethyl | methyl | bromomethyl | 3 | 1 | 1 | 4 | Monocarboxy, methyl ester | 4 | Polypropylene | Passed. |
| 50 | 2-chloroethyl | methyl | bromomethyl | 3 | 1 | 1 | 4 | | | do | Failed. |
| 51 | | | | | | | | Monocarboxy, methyl ester | 10 | do | Do. |
| 52 | 2-chloroethyl | H | Br | 4 | 0 | 1 | 2 | DEMON | 2 | Polystyrene | Passed. |
| 53 | 2-chloroethyl | H | Br | 4 | 0 | 1 | 2 | | | do | Failed. |
| 54 | | | | | | | | DEMON | 5 | do | Do. |
| 55 | ethyl | Br | H | 2 | 0 | 3 | 5 | DEMON | 5 | Polyamide | Passed. |
| 56 | ethyl | Br | H | 2 | 0 | 3 | 5 | | | do | Failed. |
| 57 | | | | | | | | DEMON | 5 | do | Do. |
| 58 | 2-chloroethyl | methyl | bromomethyl | 3 | 1 | 1 | 10 | DEMON | 10 | Poly(methylmethacrylate). | Passed. |
| 59 | 2-chloroethyl | methyl | bromomethyl | 3 | 1 | 1 | 10 | | | do | Failed. |
| 60 | 2-chloroethyl | H | Br | 4 | 0 | 1 | 7.5 | DEMON | 7.5 | Butadiene/styrene 25/75. | Passed. |
| 61 | 2-chloroethyl | H | Br | 4 | 0 | 1 | 7.5 | | | do | Do. |
| 62 | | | | | | | | DEMON | 10 | do | Failed. |
| 63 | 2-chloroethyl | H | Br | 4 | 0 | 1 | 10 | DEMON | 10 | (¹) | Passed. |
| 64 | 2-chloroethyl | H | Br | 4 | 0 | 1 | 10 | | | do¹ | Failed. |
| 65 | | | | | | | | DEMON | 20 | do¹ | Do. |
| 66 | 2-chloroethyl | methyl | bromomethyl | 3 | 1 | 1 | 20 | DEMON | 20 | do¹ | Passed. |
| 67 | 2-chloroethyl | methyl | bromomethyl | 3 | 1 | 1 | 20 | | | do¹ | Failed. |
| 68 | | | | | | | | DEMON-$ | 20 | do¹ | Do. |
| 69 | 2-chloroethyl | methyl | bromomethyl | 3 | 1 | 1 | 4 | DEMON | 4 | Polypropylene | Passed. |
| 70 | 2-chloroethyl | methyl | bromomethyl | 3 | 1 | 1 | 4 | | | do | Failed. |
| 71 | 2-chloroethyl | methyl | | 3 | 2 | 0 | 10 | DEMON | 10 | do | Passed. |
| 72 | 2-chloroethyl | methyl | | 3 | 2 | 0 | 10 | | | do | Failed. |
| 73 | 2-chloroethyl | | | 0 | 5 | 0 | 15 | DEMON | 15 | do | Passed. |
| 74 | 2-chloroethyl | | | 0 | 5 | 0 | 15 | | | do | Failed. |
| 75 | ethyl | methyl | bromomethyl | 3 | 0 | 2 | 10 | DEMON | 5 | do | Passed. |
| 76 | ethyl | methyl | bromomethyl | 3 | 0 | 2 | 10 | | | do | Failed. |
| 77 | ethyl | H | Br | 4 | 0 | 1 | 10 | DEMON | 10 | do | Passed. |
| 78 | ethyl | H | Br | 4 | 0 | 1 | 10 | | | do | Failed. |

NOTE.—See Table I for code.   ¹ Commercially available ABS-type resin.

All of the products produced according to Examples 1 to 78 which passed the flame-test exhibited little or no color change when subjected to high temperature processing conditions.

I claim:
1. A flame-retardant composition comprising a combination of (1) a compound having the formula A

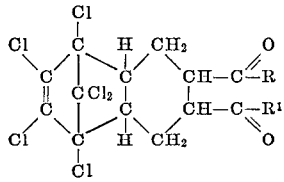

wherein R and $R^1$, taken together, constitute an oxygen atom or R and $R^1$, taken separately, are, individually, a hydroxy radical, an alkoxy radical of 1–8 carbon atoms, inclusive, or a haloalkyl radical of 1–4 carbon atoms, inclusive, and (2) a compound selected from the group consisting of those having the Formula B

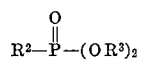

wherein $R^2$ represents an aryl radical of 6–10 carbon atoms, inclusive, a halo or alkyl substituted aryl radical of 6–10 carbon atoms, inclusive, an alkyl radical of 1–8 carbon atoms, inclusive, a halo-substituted alkyl radical of 1–8 carbon atoms, inclusive, an aralkyl radical of 7–14 carbon atoms, inclusive, or an ar-alkyl or an ar-halo-substituted aralkyl radical of 7–14 carbon atoms, inclusive, and $R^3$ represents a halo-substituted aryl radical of 6–10 carbon atoms, inclusive, an alkyl radical of 1–8 carbon atoms, inclusive, a halo-substituted alkyl radical of 1–8 carbon atoms, inclusive, an aralkyl radical of 7–14 carbon atoms, inclusive, or a halo-ar-substituted arakyl radical of 7–14 carbon atoms, inclusive, and those having the Formula C

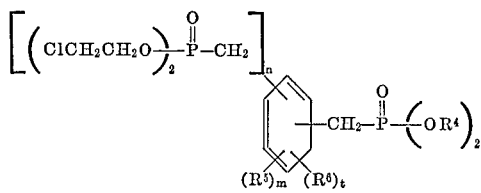

wherein $R^4$ is the same as $R^3$, above and $R^5$ and $R^6$, individually, represent hydrogen, bromine, chlorine, an alkyl radical of 1–4 carbon atoms, inclusive, or a halo-alkyl radical of 1–4 carbon atoms, inclusive, and $n$, $m$ and $t$ are whole, positive integers of 0–5, inclusive, the total of $n+m+t$ being 5 the ratio of (1) to (2) ranging from about 3 to 1 to 3, respectively.

2. A composition according to claim 1 wherein $n$ is 0, $R^4$ is 2-chloroethyl, $R^5$ is hydrogen, $m$ is 4, $R^6$ is bromine and $t$ is 1.

3. A composition according to claim 1 wherein $n$ is 0, $R^4$ is ethyl, $R^5$ is chlorine, $m$ is 2, $R^6$ is hydrogen and $t$ is 3.

4. A composition according to claim 1 wherein $n$ is 0, $R^4$ is ethyl, $R^5$ is hydrogen, $m$ is 4, $R^6$ is bromine and $t$ is 1.

5. A composition according to claim 1 wherein R and $R^1$, together, form an oxygen atom.

6. A composition according to claim 1 wherein $R^4$ is 2-chloroethyl, $R^5$ is methyl, $R^6$ is bromomethyl, $m$ is 3, $n$ is 1 and $t$ is 1.

7. A flame-retarded composition comprising a thermoplastic polymer selected from the group consisting of those produced from unsaturated ethylenically monomers, polyamides and polycarbonates having incorporated therein a flame-retarding amount of the composition of claim 1 the amount of each component of the combination being less than that amount at which the component individually functions similarly to the combination in the same polymer.

8. A composition according to claim 7 wherein R and $R^1$, together, form an oxygen atom.

9. A composition according to claim 7 wherein, R and $R^1$, together, form an oxygen atom, $n$ is 0, $R^4$ is 2-chloroethyl, $R^5$ is hydrogen, $m$ is 4, $R^6$ is bromine and $t$ is 1.

10. A composition according to claim 7 wherein said thermoplastic polymer is polypropylene.

References Cited
UNITED STATES PATENTS

| | | | |
|---|---|---|---|
| 2,877,204 | 3/1959 | Duhnrack et al. | 260—45.7 |
| 3,152,172 | 10/1964 | Roberts et al. | 260—468 |
| 3,255,145 | 6/1966 | Graham | 260—45.7 |
| 3,442,980 | 5/1969 | Grabowski | 260—880 |
| 3,446,822 | 5/1969 | Dunkel | 260—346.3 |

HOSEA E. TAYLOR, Primary Examiner

V. P. HOKE, Assistant Examiner

U.S. Cl. X.R.

252—8.1; 260—45.7, 45.85

UNITED STATES PATENT OFFICE
CERTIFICATE OF CORRECTION

Patent No. 3,547,878  Dated December 15, 1970

Inventor(s) Christos Savides

It is certified that error appears in the above-identified patent and that said Letters Patent are hereby corrected as shown below:

Column 3, formula (IV) "$CH_2-C$" should be -- $CH_2=C$ -- .

Columns 5 and 6, Table I, Example 7 under the heading " "p-brompohenyl" should be -- p-bromophenyl -- .

Column 7, line 19, Claim 1, "haloalkyl" should be -- haloalkoxy -- .

Column 8, line 5, Claim 1, " 3 to 1 to 3" should be -- 3 to 1 to 1 to 3 -- .

Signed and sealed this 4th day of January 1972.

(SEAL)
Attest:

EDWARD M. FLETCHER, JR.
Attesting Officer

ROBERT GOTTSCHALK
Acting Commissioner of Pat